US008392692B2

(12) United States Patent
Gunnam

(10) Patent No.: US 8,392,692 B2
(45) Date of Patent: Mar. 5, 2013

(54) DETERMINING INDEX VALUES FOR BITS OF BINARY VECTOR BY PROCESSING MASKED SUB-VECTOR INDEX VALUES

(75) Inventor: Kiran Gunnam, San Jose, CA (US)

(73) Assignee: LSI Corporation, San Jose, CA (US)

( * ) Notice: Subject to any disclaimer, the term of this patent is extended or adjusted under 35 U.S.C. 154(b) by 902 days.

(21) Appl. No.: 12/333,840

(22) Filed: Dec. 12, 2008

(65) Prior Publication Data
US 2010/0042806 A1    Feb. 18, 2010

Related U.S. Application Data

(60) Provisional application No. 61/089,297, filed on Aug. 15, 2008, provisional application No. 61/109,275, filed on Oct. 29, 2008.

(51) Int. Cl.
*G06F 17/16* (2006.01)
(52) U.S. Cl. ............................. 712/5; 708/520; 712/222
(58) Field of Classification Search .................. None
See application file for complete search history.

(56) References Cited

U.S. PATENT DOCUMENTS

| 6,609,189 B1 * | 8/2003 | Kuszmaul et al. ............. 712/23 |
| 6,681,315 B1 * | 1/2004 | Hilts et al. ..................... 712/4 |
| 6,978,458 B1 * | 12/2005 | Ghosh et al. ................. 718/100 |
| 7,149,139 B1 * | 12/2006 | Rosen ............................ 365/221 |

\* cited by examiner

*Primary Examiner* — Kenneth Kim
(74) *Attorney, Agent, or Firm* — Mendelsohn, Drucker & Associates, P.C.; Craig M. Brown; Steve Mendelsohn

(57) ABSTRACT

In one embodiment, the present invention determines index values corresponding to bits of a binary vector that have a value of 1. During each clock cycle, a masking technique is applied to M sub-vector index values, where each sub-vector index value corresponds to a different bit of a sub-vector of the binary vector. The masking technique is applied such that (i) the sub-vector index values that correspond to bits having a value of 0 are zeroed out and (ii) the sub-vector index values that correspond to the bits having a value of 1 are left unchanged. The masked sub-vector index values are sorted, and index values are calculated based on the masked sub-vector index values. The index values generated are then distributed uniformly to a number M of index memories such that the M index memories store substantially the same number of index values.

20 Claims, 15 Drawing Sheets

| TABLE I: Index Values Corresponding to an Exemplary Binary Vector u | | | | | | | | | | | | | |
|---|---|---|---|---|---|---|---|---|---|---|---|---|---|
| Bit Value of binary vector u | 0 | 1 | 0 | 0 | 1 | 0 | 0 | 1 | 0 | 1 | · · · | 1 | 0 |
| Index Value/ Clock Cycle (shown in decimals) | 0 | 1 | 2 | 3 | 4 | 5 | 6 | 7 | 8 | 9 | 10 · · · | 254 | 255 |

Fig. 2 (Prior Art)

| TABLE II: Index Values Stored in Index Memory | | | | | | |
|---|---|---|---|---|---|---|
| IM Address (shown in decimals) | 0 | 1 | 2 | 3 | · · · | 63 |
| Index Value (shown in decimals) | 1 | 4 | 7 | 9 | · · · | 254 |

Fig. 3 (Prior Art)

TABLE III: Exemplary Binary Vector u

| Sub-Vector s/ u Memory Address (shown in decimals) | Bit Values | | | | | | | |
|---|---|---|---|---|---|---|---|---|
| 31 | 0 | 0 | 0 | 0 | 0 | 0 | 1 | 0 |
| ... | ... | ... | ... | ... | ... | ... | ... | ... |
| 9 | 1 | 0 | 0 | 0 | 0 | 0 | 0 | 1 |
| 8 | 0 | 1 | 0 | 0 | 0 | 0 | 1 | 0 |
| 7 | 0 | 1 | 0 | 1 | 0 | 0 | 0 | 0 |
| 6 | 0 | 0 | 0 | 1 | 0 | 1 | 0 | 0 |
| 5 | 1 | 0 | 1 | 0 | 0 | 0 | 0 | 0 |
| 4 | 0 | 1 | 0 | 0 | 0 | 0 | 0 | 0 |
| 3 | 1 | 0 | 1 | 0 | 0 | 0 | 1 | 0 |
| 2 | 0 | 1 | 1 | 0 | 0 | 1 | 0 | 0 |
| 1 | 0 | 1 | 0 | 1 | 0 | 0 | 1 | 0 |
| 0 | 0 | 1 | 1 | 0 | 1 | 0 | 0 | 1 |

Fig. 5 (Prior Art)

| TABLE IV: Index Values Generated by Apparatus 400 of FIG. 4 for Each Bit of Exemplary Binary Vector u | | | | | | | | |
|---|---|---|---|---|---|---|---|---|
| Sub-Vector s/ Clock Cycle (shown in decimals) | Index Values (shown in decimals) | | | | | | | |
| | 418(0) | 418(1) | 418(2) | 418(3) | 418(4) | 418(5) | 418(6) | 418(7) |
| 31 | 248 | 249 | 250 | 251 | 252 | 253 | 254 | 255 |
| ... | | | | • • • | | | | |
| 9 | 72 | 73 | 74 | 75 | 76 | 77 | 78 | 79 |
| 8 | 64 | 65 | 66 | 67 | 68 | 69 | 70 | 71 |
| 7 | 56 | 57 | 58 | 59 | 60 | 61 | 62 | 63 |
| 6 | 48 | 49 | 50 | 51 | 52 | 53 | 54 | 55 |
| 5 | 40 | 41 | 42 | 43 | 44 | 45 | 46 | 47 |
| 4 | 32 | 33 | 34 | 35 | 36 | 37 | 38 | 39 |
| 3 | 24 | 25 | 26 | 27 | 28 | 29 | 30 | 31 |
| 2 | 16 | 17 | 18 | 19 | 20 | 21 | 22 | 23 |
| 1 | 8 | 9 | 10 | 11 | 12 | 13 | 14 | 15 |
| 0 | 0 | 1 | 2 | 3 | 4 | 5 | 6 | 7 |

Fig. 6 (Prior Art)

TABLE V: Storage of the Index Values of FIG. 6 in the Index Memories of Apparatus 400 of FIG. 4

| Index Memory Address (shown in decimals) | Index Values (shown in decimals) | | | | | | | |
|---|---|---|---|---|---|---|---|---|
| | 410(0) | 410(1) | 410(2) | 410(3) | 410(4) | 410(5) | 410(6) | 410(7) |
| 63 | | | | | | | | |
| ... | | | | ... | | | | |
| 6 | | 65 | | | | | | |
| 5 | | 57 | | | | | | |
| 4 | | 41 | | | | | | |
| 3 | | 25 | | | | | | |
| 2 | 72 | 17 | | | | | 70 | 79 |
| 1 | 40 | 9 | 34 | 59 | 52 | 45 | 54 | 39 |
| 0 | 24 | 1 | 18 | 11 | 4 | 21 | 14 | 7 |

Fig. 7 (Prior Art)

TABLE VI: Incremented Sub-Vector Index Values Generated by Apparatus 800 of FIG. 8 for the Binary Vector of FIG. 5.

| Sub-Vector/ Clock Cycle (shown in decimals) | Incremented Sub-Vector Index Values (shown in decimals) | | | | | | | |
|---|---|---|---|---|---|---|---|---|
| 31 | 1 | 2 | 3 | 4 | 5 | 6 | 7 | 8 |
| ⋮ | | | | | | | | |
| 9 | 1 | 2 | 3 | 4 | 5 | 6 | 7 | 8 |
| 8 | 1 | 2 | 3 | 4 | 5 | 6 | 7 | 8 |
| 7 | 1 | 2 | 3 | 4 | 5 | 6 | 7 | 8 |
| 6 | 1 | 2 | 3 | 4 | 5 | 6 | 7 | 8 |
| 5 | 1 | 2 | 3 | 4 | 5 | 6 | 7 | 8 |
| 4 | 1 | 2 | 3 | 4 | 5 | 6 | 7 | 8 |
| 3 | 1 | 2 | 3 | 4 | 5 | 6 | 7 | 8 |
| 2 | 1 | 2 | 3 | 4 | 5 | 6 | 7 | 8 |
| 1 | 1 | 2 | 3 | 4 | 5 | 6 | 7 | 8 |
| 0 | 1 | 2 | 3 | 4 | 5 | 6 | 7 | 8 |

Fig. 9

TABLE VII: Masked Sub-Vector Index Values Generated by Apparatus 800 of FIG. 8 for the Incremented Sub-Vector Index Values of FIG. 9.

| Sub-Vector/ Clock Cycle (shown in decimals) | Masked Sub-Vector Index Values (shown in decimals) | | | | | | | |
|---|---|---|---|---|---|---|---|---|
| 31 | 0 | 0 | 0 | 0 | 0 | 0 | 7 | 0 |
| ⋮ | | | | | | | | |
| 9 | 1 | 0 | 0 | 0 | 0 | 0 | 0 | 8 |
| 8 | 0 | 2 | 0 | 0 | 0 | 0 | 7 | 0 |
| 7 | 0 | 2 | 0 | 4 | 0 | 0 | 0 | 0 |
| 6 | 0 | 0 | 0 | 0 | 5 | 0 | 7 | 0 |
| 5 | 1 | 2 | 0 | 0 | 0 | 6 | 0 | 0 |
| 4 | 0 | 0 | 3 | 0 | 0 | 0 | 0 | 8 |
| 3 | 1 | 2 | 3 | 0 | 0 | 0 | 0 | 0 |
| 2 | 0 | 2 | 0 | 0 | 0 | 6 | 7 | 0 |
| 1 | 0 | 2 | 0 | 4 | 0 | 0 | 0 | 0 |
| 0 | 0 | 2 | 0 | 0 | 5 | 0 | 0 | 8 |

Fig. 10

TABLE VIII: Sorted, Masked Sub-Vector Index Values Generated by Apparatus 800 Based on the Masked Sub-Vector index values of FIG. 10.

| Sub-Vector/ Clock Cycle (shown in decimals) | Sorted, Masked Sub-Vector Index Values (shown in decimals) | | | | | | | |
|---|---|---|---|---|---|---|---|---|
| | t0 | t1 | t2 | t3 | t4 | t5 | t6 | t7 |
| 31 | 7 | 0 | 0 | 0 | 0 | 0 | 0 | 0 |
| ... | | | | | | | | |
| 9 | 8 | 1 | 0 | 0 | 0 | 0 | 0 | 0 |
| 8 | 7 | 2 | 0 | 0 | 0 | 0 | 0 | 0 |
| 7 | 4 | 2 | 0 | 0 | 0 | 0 | 0 | 0 |
| 6 | 7 | 5 | 0 | 0 | 0 | 0 | 0 | 0 |
| 5 | 6 | 2 | 1 | 0 | 0 | 0 | 0 | 0 |
| 4 | 8 | 3 | 0 | 0 | 0 | 0 | 0 | 0 |
| 3 | 2 | 1 | 0 | 0 | 0 | 0 | 0 | 0 |
| 2 | 6 | 3 | 2 | 0 | 0 | 0 | 0 | 0 |
| 1 | 7 | 4 | 2 | 0 | 0 | 0 | 0 | 0 |
| 0 | 8 | 5 | 2 | 0 | 0 | 0 | 0 | 0 |

Fig. 11

TABLE IX: Sorted Sub-Vector Index Values Generated by Apparatus 800 Based on the Sorted, Masked Sub-Vector Index Values of FIG. 11.

| Sub-Vector/ Clock Cycle (shown in decimals) | Sub-Vector Index Values (shown in decimals) | | | | | | | |
|---|---|---|---|---|---|---|---|---|
| | t0 | t1 | t2 | t3 | t4 | t5 | t6 | t7 |
| 31 | 6 | -1 | -1 | -1 | -1 | -1 | -1 | -1 |
| ... | | | | | | | | |
| 9 | 7 | 0 | -1 | -1 | -1 | -1 | -1 | -1 |
| 8 | 6 | 1 | -1 | -1 | -1 | -1 | -1 | -1 |
| 7 | 3 | 1 | -1 | -1 | -1 | -1 | -1 | -1 |
| 6 | 6 | 4 | -1 | -1 | -1 | -1 | -1 | -1 |
| 5 | 5 | 1 | 0 | -1 | -1 | -1 | -1 | -1 |
| 4 | 7 | 2 | -1 | -1 | -1 | -1 | -1 | -1 |
| 3 | 1 | 0 | -1 | -1 | -1 | -1 | -1 | -1 |
| 2 | 5 | 2 | 1 | -1 | -1 | -1 | -1 | -1 |
| 1 | 6 | 3 | 1 | -1 | -1 | -1 | -1 | -1 |
| 0 | 7 | 4 | 1 | -1 | -1 | -1 | -1 | -1 |

Fig. 12

TABLE X: Population of Registers 830 and 832 with Index Values Generated by Apparatus 800 of FIG. 8 Based on the Sorted Index Values of FIG. 12

| Register Address | Index Values (shown in decimals) | | | | | | | |
|---|---|---|---|---|---|---|---|---|
| | 0 | 1 | 2 | 3 | 4 | 5 | 6 | 7 |
| Register 832 | 17 | 25 | 24 | 39 | 34 | 45 | 41 | 40 |
| Register 830 | 7 | 4 | 1 | 14 | 11 | 9 | 21 | 18 |

Fig. 13

TABLE XI: Population of the Index Memories of FIG. 8 Based on the Index Values from FIG. 12

| Index Memory Address (shown in decimals) | Index Values (shown in decimals) | | | | | | | |
|---|---|---|---|---|---|---|---|---|
| | 836(0) | 836(1) | 836(2) | 836(3) | 836(4) | 836(5) | 836(6) | 836(7) |
| 8 | | | | | | | | |
| ⋮ | | | ⋮ | ⋮ | ⋮ | | | |
| 2 | 54 | 52 | 59 | 57 | 70 | 65 | 79 | 72 |
| 1 | 17 | 25 | 24 | 39 | 34 | 45 | 41 | 40 |
| 0 | 7 | 4 | 1 | 14 | 11 | 9 | 21 | 18 |

Fig. 14

TABLE XIII: Shifted Sub-Vector Index Values Generated by Apparatus 1500 of FIG. 15 for the Sorted, Masked Sub-Vector Index Values of FIG. 11.

| Sub-Vector/ Clock Cycle (shown in decimals) | Shifted, Sub-Vector Index Values (shown in decimals) | | | | | | | |
|---|---|---|---|---|---|---|---|---|
| | t0 | t1 | t2 | t3 | t4 | t5 | t6 | t7 |
| 31 | 7 | 0 | 0 | 0 | 0 | 0 | 0 | 0 |
| · · · | | | | | | | | |
| 9 | 0 | 0 | 0 | 0 | 0 | 0 | 0 | 1 |
| 8 | 0 | 0 | 0 | 0 | 7 | 2 | 8 | 0 |
| 7 | 0 | 0 | 4 | 2 | 0 | 0 | 0 | 0 |
| 6 | 7 | 5 | 0 | 0 | 0 | 0 | 0 | 0 |
| 5 | 0 | 0 | 0 | 0 | 0 | 6 | 0 | 1 |
| 4 | 0 | 0 | 0 | 8 | 3 | 0 | 2 | 0 |
| 3 | 0 | 2 | 1 | 0 | 0 | 0 | 0 | 0 |
| 2 | 2 | 0 | 0 | 0 | 0 | 0 | 6 | 3 |
| 1 | 0 | 0 | 0 | 7 | 4 | 2 | 0 | 0 |
| 0 | 8 | 5 | 2 | 0 | 0 | 0 | 0 | 0 |

Fig. 17

TABLE XII: Shift Coefficients Generated by Apparatus 1500 for the Sorted, Masked Sub-Vector Index Values of FIG. 11.

| Sub-Vector/ Clock Cycle (shown in decimals) | $w_{acc,\,i-1}$ | Shift Coefficient$_i$ ($=w_{acc,\,i-1}$ mod $M$) |
|---|---|---|
| 31 | | |
| · | | |
| · | | |
| · | | |
| 9 | 22 | 22 mod 8 = 6 |
| 8 | 20 | 20 mod 8 = 4 |
| 7 | 18 | 18 mod 8 = 2 |
| 6 | 16 | 16 mod 8 = 0 |
| 5 | 13 | 13 mod 8 = 5 |
| 4 | 11 | 11 mod 8 = 3 |
| 3 | 9 | 9 mod 8 = 1 |
| 2 | 6 | 6 mod 8 = 6 |
| 1 | 3 | 3 mod 8 = 3 |
| 0 | 0 | 0 mod 8 = 0 |

Fig. 16

TABLE XIV: Population of the Index Memories of FIG. 15 with Index Values Generated Based on the Shifted Sub-Vector Index Values from FIG. 17

| Index Memory Address | Index Values (shown in decimals) | | | | | | | |
|---|---|---|---|---|---|---|---|---|
| | 1532(0) | 1532(1) | 1532(2) | 1532(3) | 1532(4) | 1532(5) | 1532(6) | 1532(7) |
| 0 | 54 | 52 | 59 | 57 | 70 | 65 | 79 | 72 |
| 1 | 17 | 25 | 24 | 39 | 34 | 45 | 41 | 40 |
| 2 | 7 | 4 | 1 | 14 | 11 | 9 | 21 | 18 |
| ... | | | | ... | | | | |
| 8 | | | | | | | | |

Fig. 18

DETERMINING INDEX VALUES FOR BITS OF BINARY VECTOR BY PROCESSING MASKED SUB-VECTOR INDEX VALUES

This application claims the benefit of the filing dates of U.S. provisional application No. 61/089,297 filed Aug. 15, 2008 and U.S. provisional application No. 61/109,275 filed Oct. 29, 2008, the teachings of both of which are incorporated herein by reference in their entireties.

BACKGROUND OF THE INVENTION

1. Field of the Invention

The present invention relates to signal processing, and, in particular, to bit-level processing of a binary vector.

2. Description of the Related Art

FIG. 1 shows a simplified block diagram of one implementation of a prior-art apparatus 100 for generating index values for bits of a binary vector that have a value of 1. Apparatus 100 has vector memory 102, comprising n addresses, each of which stores one bit of a binary vector u. As used in this specification, the term "address" refers to an individual storage location within memory. During each clock cycle, vector memory address counter 106 generates an index value corresponding to one of the addresses of vector memory 102 (i.e., one of the n bits of binary vector u). The index values, which (i) begin at 0, (ii) increment by 1 during each clock cycle, and (iii) end at n−1 (i.e., range from 0, . . . , n−1), may be represented in binary form, where at least $\log_2(n)$ bits are used to represent each of the n index values.

Each index value is provided to write port 112 of index memory 110 and is written to index memory 110 only if the corresponding bit of binary vector u has a value of 1. This is accomplished by supplying the corresponding bit from read port 104 of index memory 102 to both (i) write-enable port 114 of index memory 110 and (ii) index memory counter 108. If the corresponding bit value is 1, then write-enable port 114 enables write port 112 so that the index value may be written to an address of index memory 110 that is supplied by index memory counter 108. If the corresponding bit value is 0, then write enable port 114 does not enable write port 112 and the index value is not written to index memory 110.

Index memory 110 comprises a number $w_{max}$ of addresses, where $w_{max}$ is the maximum possible hamming weight of binary vector u (i.e., the maximum number of index values that may be stored in index memory 110). Each address is capable of storing one index value that comprises at least $\log_2(n)$ bits, and thus, the total size of index memory 110 is equal to at least $w_{max}$ addresses×$\log_2(n)$ bits per address. Index memory counter 108 generates an index memory address for each index value that is written to index memory 110 (i.e., that corresponds to a bit having a value of 1). The index memory addresses begin at 0, increment by 1 every time index memory counter 108 receives a bit value of 1, and end at $w_{max}-1$ (i.e., range from 0, . . . , $w_{max}-1$). After the index values are stored in index memory 110 for all bits having a value of 1, the index values may be output through read port 116, one index value at a time. To further illustrate the operation of apparatus 100, consider FIGS. 2 and 3.

FIG. 2 shows Table I, which illustrates (i) an exemplary binary vector u having n=256 bits and (ii) index values that may be generated by apparatus 100 for each of the 256 bits. As shown, vector memory address counter 106 generates a first index value of 0 for the first bit, a second index value of 1 for the second bit, a third index value of 2 for the third bit, a fourth index value of 3 for the fourth bit, a fifth index value of 4 for the fifth bit, and so on. The index values, although shown in decimal units, are provided to index memory 110 as binary numbers, where at least 8 bits (i.e., $\log_2(256)$) are used to represent each of the 256 index values.

FIG. 3 shows Table II, which illustrates how the index values from FIG. 2 may be stored in index memory 110 of FIG. 1. In this example, suppose that the maximum possible hamming weight $w_{max}$ is 64, and thus, the total size of index memory 110 is 512 bits (i.e., $w_{max} \times \log_2(n) = 64 \times \log_2(256)$). During the first clock cycle (i.e., 0), the first bit from FIG. 2 has a value of 0, so write port 112 of index memory 110 is not enabled and the first index value (i.e., 0) is not stored in index memory 110. During the second clock cycle, the second bit has a value of 1, so write port 112 is enabled and the second index value (i.e., 1) is stored in the first address (i.e., 0) of index memory 110 as shown in FIG. 3. During the third and fourth clock cycles (i.e., 2 and 3), the third and fourth bits have a value of 0, so the third and fourth index values (i.e., 2 and 3) are not stored in index memory 110. During the fifth clock cycle (i.e., 4), the fifth bit has a value of 1; thus, index memory counter 108 increments by 1 so that the fifth index value (i.e., 4) is stored in the second address (i.e., 1) of index memory 110 as shown in FIG. 3. The next two index values written to index memory 110 are index values 7 and 9, and these values are stored in the third and fourth addresses (i.e., addresses 2 and 3) of index memory 110. This process is repeated until index values have been generated for all bits of binary vector u having a value of 1. Here, as shown in FIG. 2, the last bit having a value of 1 is the 255th bit, for which an index value of 254 is generated. Index value 254 is written to the last address (i.e., 63) of index memory 110 as shown in FIG. 3.

Apparatus 100 is capable of determining index values for all bits of a binary vector u that have a value of 1 in as few as $w_{max}$ clock cycles or in as many as n clock cycles, depending on the arrangement of bits in the binary vector. For example, in the example above, where $w_{max}$ equals 64, if the first 64 bits of binary vector u had a value of 1, then apparatus 100 could determine all 64 index values corresponding to the first 64 bits in the first 64 clock cycles. On the other hand, if the last bit (i.e., the $256^{th}$ bit) of binary vector u had a value of 1, then apparatus 100 would not determine the 64th index value until the $256^{th}$ clock cycle. To reduce the number of clock cycles performed by apparatus 100, a semi-parallel architecture may be implemented that considers more than one bit during each clock cycle.

FIG. 4 shows a simplified block diagram of one implementation of an apparatus 400 that employs a semi-parallel architecture to determine index values for bits of a binary vector that have a value of 1. Apparatus 400 has a parallelization factor of M, indicating that it generates index values for a number M of bits during each clock cycle. Apparatus 400 comprises vector memory 402, which is similar to vector memory 102 of FIG. 1, is capable of storing a binary vector u having n total bits. However, unlike vector memory 102, which comprises n addresses and stores only one bit per address, vector memory 402 comprises ceil(n/M) addresses, and each address stores a sub-vector s of binary vector u that comprises M bits. The ceiling function ceil(n/M)) represents the integer value that is equal to or just exceeds n/M.

During each clock cycle, vector memory address counter 406 generates an address corresponding to one of sub-vectors s stored in vector memory 402. The addresses, which (i) begin at 0, (ii) increment by 1 during each clock cycle, and (iii) end at ceil(n/M)−1, may be represented in binary form, where the number of bits used to represent each of the addresses is at least $\log_2(\text{ceil}(n/M))$. Each address generated is provided to M computation blocks 418(0), . . . , 418(M−1), which calculate M index values based on each address using Equation (1) below:

$$\text{index value} = (bc \times M) + m, \quad (1)$$

where bc represents the vector memory address provided by vector memory address counter 406. Each of the index values corresponds to one of the bits m of a sub-vector s of binary vector u where m=0, . . . , M−1. The index values may be represented in binary form, where the number of bits used to represent each index value is at least $\log_2(n)$. To further understand the generation of index values in relation to apparatus 400, suppose that the parallelization factor M of apparatus 400 is equal to 8 and that vector memory 402 is capable of storing n=256 bits.

FIG. 5 shows Table III, which illustrates an exemplary binary vector u that is divided into 32 sub-vectors s ranging from 0, . . . , 31, where each sub-vector s comprises eight bits. The first eight bits 0, 1, 0, 0, 1, 0, 0, and 1 (i.e., sub-vector 0) of binary vector u may be stored in the first address (i.e., 0) of vector memory 402, the second eight bits 0, 1, 0, 1, 0, 0, 1, and 0 (i.e., sub-vector 1) may be stored in the second address (i.e., 1) of vector memory 402, the third eight bits 0, 1, 1, 0, 0, 1, 0, and 0 (i.e., sub-vector 2) may be stored in the third address (i.e., 2) of vector memory 402, and so on. To store all 32 sub-vectors, vector memory 402 comprises at least 32 addresses, where each address may be represented by at least five bits (i.e., $\log_2(32)$).

FIG. 6 shows Table IV, which illustrates the index values that may be generated by apparatus 400 for the bits of the exemplary binary vector u of FIG. 5. During the first clock cycle (i.e., clock cycle 0), the first vector memory address (i.e., address 0 from FIG. 5) is provided to computation blocks 418(0), . . . , 418(7), which calculate the first eight index values using Equation (1). For example, first computation block 418(0) calculates an index value of 0 (i.e., (bc× M)+m=(0×8)+0=0), which corresponds to the first bit of first sub-vector 0 shown in FIG. 5. Second computation block 418(1) calculates an index value equal to 1 (i.e., (0×8)+1=1), which corresponds to the second bit of first sub-vector 0. Computation blocks 418(2), . . . , 418(7) calculate index values 2, . . . , 7, respectively, in a similar manner for the third through eighth bits of first sub-vector 0. During the second clock cycle (i.e., clock cycle 1), the second address (i.e., address 1 from FIG. 5) is provided to computation blocks 418(0), . . . , 418(7). First computation block 418(0) calculates an index value equal to 8 (i.e., (1×8)+0=8), which corresponds to the first bit of second sub-vector 1 shown in FIG. 5. Second computation block 418(1) calculates an index value equal to 9 (i.e., (1×8)+1=9), which corresponds to the second bit of the second sub-vector 1. Computation blocks 418(2), . . . , 418(7) calculate index values 10, . . . , 15, respectively, in a similar manner for the third through eighth bits of second sub-vector 1. This process is repeated for subsequent clock cycles to generate further index values (up to 255). Although these index values are shown in FIG. 6 in decimal units, they may be provided to index memories 410(0), . . . , 410(7) as binary numbers, where each index value is represented by at least eight bits (i.e., $\log_2(256)$).

Referring back to FIG. 4, each computation block (i.e., 418(0), . . . , 418(M−1)) provides the index value that it generates during each clock cycle to the write port (i.e., 412(0), . . . , 412(M−1) of its corresponding index memory (i.e., 410(0), . . . , 410(M−1)). Similar to apparatus 100 of FIG. 1, only those index values corresponding to bits of binary vector u that have a value of 1 are written to index memory. This is accomplished by enabling the write port of each index memory in a manner similar to that used by apparatus 100. In particular, during each clock cycle, bits m=0, . . . , M−1 of sub-vector s are provided to (i) write enable ports 414(0), . . . , 414(M−1) of index memories 410(0), . . . , 410(M−1), respectively, and (ii) index memory counters 408(0), . . . , 408(M−1), respectively. If any of bits 0, . . . , M−1 have a value of 1, then the write ports (i.e., 412(0), . . . , 412(M−1)) of the index memories corresponding to those bits are enabled so that the index values provided by the corresponding computation blocks are written to an address of the index memories. The index memory addresses supplied by each index memory counter (i.e., 408(0), . . . , 408(M−1)), begin at 0, increment by 1 every time that the index memory counter receives a bit value of 1, and end at $W_{max}$−1. To further understand how the index values are written to the index memories, consider FIG. 7, which expands on the example provided above.

FIG. 7 shows Table V, which illustrates how the index values of FIG. 6 may be stored in the index memories of apparatus 400 of FIG. 4. The index values shown correspond to the first ten sub-vectors s of FIG. 6. Suppose that the maximum possible hamming weight $w_{max}$ that may be processed by apparatus 400 is equal to 64. During the first clock cycle (i.e., clock cycle 0), bit values 0, 1, 0, 0, 1, 0, 0, and 1 (i.e., first sub-vector 0 from FIG. 5) are provided to index memories 410(0), . . . , 410(7), respectively, and index values 0, 1, 2, 3, 4, 5, 6, and 7 (i.e., the index values from FIG. 6 corresponding to sub-vector 0) are provided to index memories 410(0), . . . , 410(7), respectively. Index values 0, 2, 3, 5, and 6 correspond to bit values having a value of 0, so they are not written to the corresponding index memories (i.e., 410(0), 410(2), 410(3), 410(5), and 410(6), respectively). Index values 1, 4, and 7, on the other hand, correspond to bits having a value of 1, so they are written to the corresponding index memories (i.e., 410(1), 410(4), and 410(7)). Index values 1, 4, and 7, are written to the first addresses (i.e., 0) of index memories 410(1), 410(4), and 410(7), respectively, as shown in FIG. 7, since no index values were previously written to these addresses.

During the second clock cycle (i.e., clock cycle 1), bit values 0, 1, 0, 1, 0, 0, 1, and 0 (i.e., sub-vector 1 from Table FIG. 5) are provided to index memories 410(0), . . . , 410(7), respectively, and index values 8, 9, 10, 11, 12, 13, 14, and 15 (i.e., the index values from FIG. 6 corresponding to sub-vector 1) are provided to index memories 410(0), . . . , 410(7), respectively. Index values 8, 10, 12, 13, and 15 correspond to bits having a value of 0, so they are not written to the corresponding index memories (i.e., 410(0), 410(2), 410(4), 410(5), and 410(7), respectively). Index values 9, 11, and 14, on the other hand, correspond to bits having a value of 1, so they are written to index memories 410(1), 410(3), and 410(6), respectively. Index values 11, and 14 are written to the first index memory address (i.e., 0) of index memories 410(3), and 410(6), respectively, as shown in FIG. 7, since no index values were previously written to these addresses. Since index value 1 was written to the first address (i.e., 0) of index memory 410(1), the index memory address is incremented by 1 by index memory counter 408(1) so that index value 9 is written to the second address (i.e., 1) of index memory 410(1) as shown in FIG. 7.

During the third clock cycle (i.e., clock cycle 2), bit values 0, 1, 1, 0, 0, 1, 0, and 0 (i.e., sub-vector 2 from FIG. 5) are provided to index memories 410(0), . . . , 410(7), respectively, and index values 16, 17, 18, 19, 20, 21, 22, and 23 (i.e., the index values from FIG. 6 corresponding to sub-vector 2) are provided to index memories 410(0), . . . , 410(7), respectively. Index values 16, 19, 20, 22, and 23 correspond to bits having a value of 0, so they are not written to the corresponding index memories (i.e., 410(0), 410(3), 410(4), 410(6), and 410(7), respectively). Index values 17, 18, and 21, on the other hand, correspond to bits having a value of 1, so they are written to index memories 410(1), 410(2), and 410(5), respectively. Index values 18 and 21 are written to the first addresses (i.e., 0) of index memories 410(2) and 410(5), respectively, as shown in FIG. 7, since no index values were previously written to these addresses. Since index values 1 and 9 were written to the first two addresses (i.e., 0 and 1) of index memory 410(1), the index memory address is incremented by 1 by index memory counter 408(1) so that index value 17 is written to the third address (i.e., 2) of index memory 410(1) as shown in FIG. 7.

As shown in FIG. 7, apparatus 400 might not distribute the index values uniformly to the index memories. As a result, some index memories, such as index memory 410(1), might store more index values than others. Depending on the arrangement of bits within a binary vector u, it is possible that all index values corresponding to the bits of binary vector u that have a value of 1 could be distributed to one index memory. To accommodate this possibility, all of the index memories are designed to store the maximum possible number of index values $w_{max}$. Thus, the number of addresses in each index memory is equal the maximum possible hamming weight $w_{max}$ of binary vector u, and the total size of each index memory is equal to at least $w_{max}$ addresses×$\log_2(n)$ bits per address. Since there are M total index memories, the combined size of the index memories is equal to at least M×$w_{max}$×$\log_2(n)$ bits. In the example above, the combined size of index memories 410(0), . . . , 410(7) is equal to 8×64×8=4,096 bits.

As described above, prior-art apparatus 100 of FIG. 1 may determine the index values for all bits of a binary vector u that have a value of 1 in $w_{max}$ to n clock cycles (i.e., 64 to 256 clock cycles in the example for FIG. 1) depending on the arrangement of bits in the binary vector u. Apparatus 400, on the other hand, may determine the index values for all bits of a binary vector u that have a value of 1 in $W_{max}$/M to n/M clock cycles (i.e., 8 to 32 clock cycles in the example for FIG. 4) depending on the arrangement of bits in the binary vector u. In considering the same binary vector u, apparatus 400 may determine the index values for all bits of the binary vector u that have a value of 1 M times faster than apparatus 100.

SUMMARY OF THE INVENTION

In one embodiment, the present invention is a method for processing a binary vector. The method comprises generating binary-vector index values for bits of the binary vector, wherein each binary-vector index value corresponds to a bit of the binary vector that is equal to a specified bit value. The binary-vector index values are then distributed substantially uniformly to M parallel output paths regardless of the arrangement of the bits in the binary vector. In another embodiment, the present invention is an apparatus for performing the method described above.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

FIG. 2 shows Table I, which illustrates index values that may be generated by the apparatus of FIG. 1 for an exemplary binary vector;

FIG. 3 shows Table II, which illustrates how the index values from FIG. 2 may be stored in the index memory of FIG. 1;

FIG. 5 shows Table III, which illustrates an exemplary binary vector that is divided into 32 sub-vectors, where each sub-vector comprises eight bits;

FIG. 6 shows Table IV, which illustrates the index values that may be generated by the prior-art apparatus of FIG. 4 for the bits of the exemplary binary vector of FIG. 5;

FIG. 7 shows Table V, which illustrates how the index values of FIG. 6 may be stored in the index memories of the prior-art apparatus of FIG. 4;

FIG. 9 shows Table VI, which illustrates incremented sub-vector index values that may be generated by the apparatus of FIG. 8 for the binary vector of FIG. 5;

FIG. 10 shows Table VII, which illustrates masked sub-vector index values that may be generated by the apparatus of FIG. 8 based on the incremented sub-vector index values of FIG. 9;

FIG. 11 shows Table VIII, which illustrates how the masked sub-vector index values of FIG. 10 may be sorted by the apparatus of FIG. 8;

FIG. 12 shows Table VIII, which illustrates how the sorted, masked sub-vector index values of FIG. 11 may be decreased by 1 using the apparatus of FIG. 8;

FIG. 13 shows Table X, which illustrates how index values, generated by the apparatus of FIG. 8 based on the sorted sub-vector index values of FIG. 12, may be stored in the seventh and eighth registers of FIG. 8;

FIG. 14 shows Table XI, which illustrates how index values from FIG. 13 may be stored in the index memories of FIG. 8;

FIG. 16 shows Table XII, which illustrates the shift coefficients that may be generated by the apparatus of FIG. 15 for the sorted, masked sub-vector index values of FIG. 11;

FIG. 17 shows Table XIII, which illustrates the shifted sub-vector index values that may be generated by the apparatus of FIG. 15 based on the sorted, masked sub-vector index values of FIG. 11 and the shift coefficients of FIG. 16;

FIG. 18 shows Table XIV, which illustrates how index values, generated by FIG. 15 based on the shifted sub-vector index values from FIG. 17, may be stored in the index memories of FIG. 15;

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Figure 1:
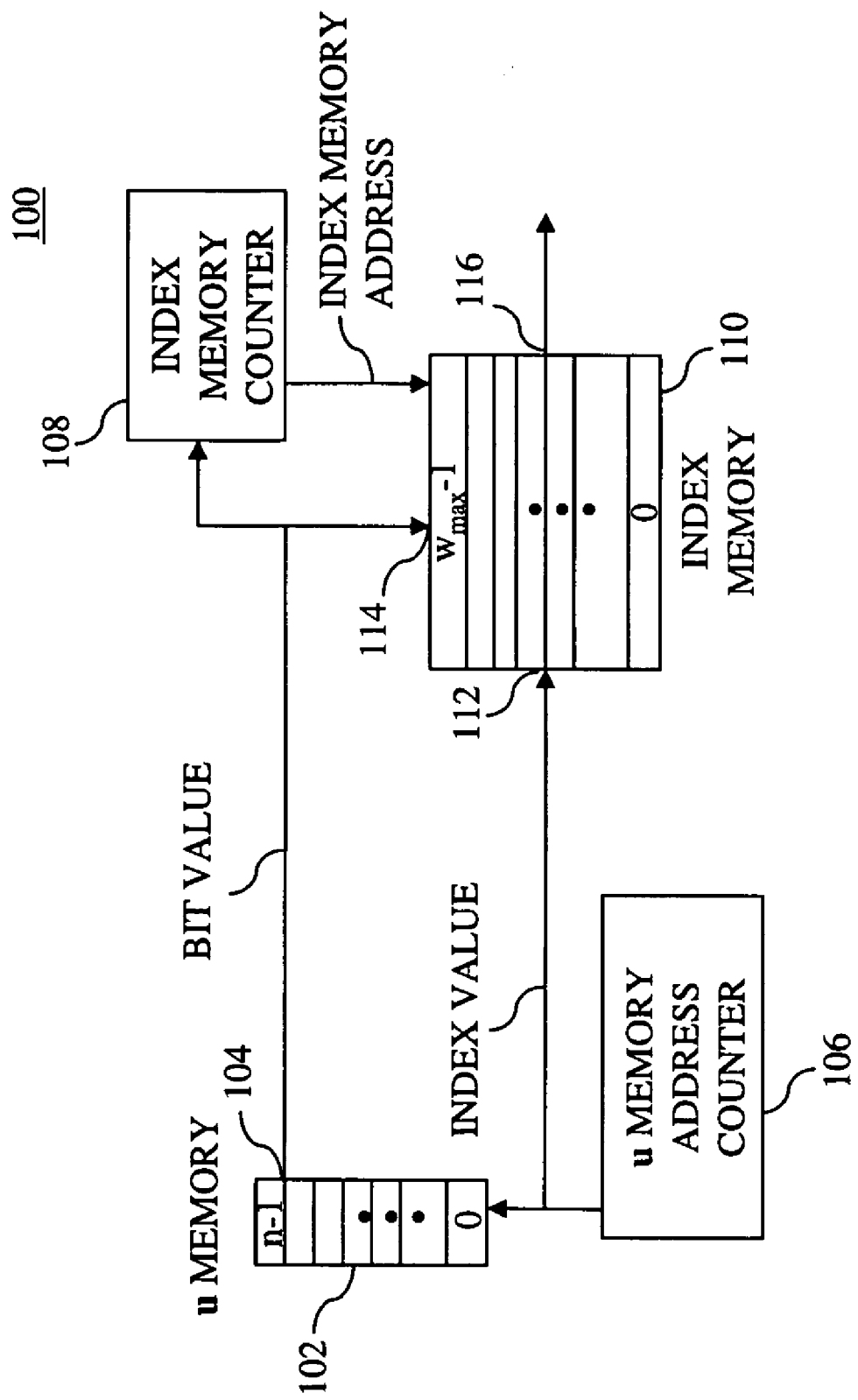
FIG. 1 shows a simplified block diagram of one implementation of a prior-art apparatus for generating index values for bits of a binary vector that have a value of 1.
Figure 4:
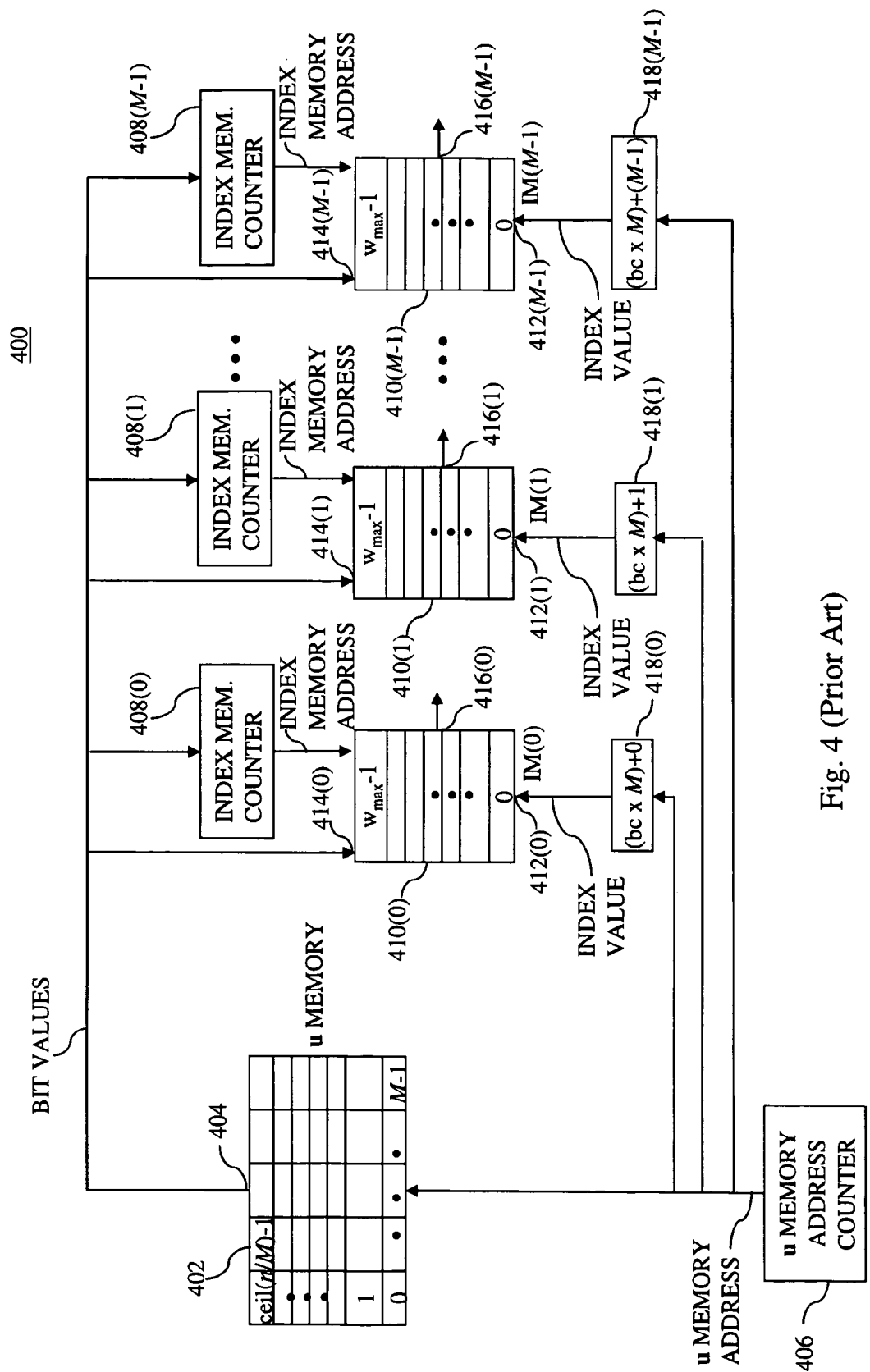
FIG. 4 shows a simplified block diagram of one implementation of a prior-art apparatus that employs a semi-parallel architecture to determine index values for bits of a binary vector that have a value of 1.

As discussed in the description of the related art, for each binary vector u considered, prior-art apparatus 400 of FIG. 4 stores $w_{max}$ index values, where each index value is stored in a different index memory address. The total number of index memory addresses employed by prior-art apparatus 400 is $M \times w_{max}$, and thus, at least $(M \times w_{max}) - w_{max} = (M-1) \times w_{max}$ index memory addresses are not used for each binary vector considered. These unused addresses may increase both the cost and the size of the apparatus over that of a comparable apparatus that has a lesser number of unused index memory addresses, such as prior-art apparatus 100 of FIG. 1. According to various embodiments of the present invention, apparatuses having semi-parallel architectures may be envisioned for determining index values for bits of a binary vector that have a value of 1, where the apparatuses employ lesser numbers of unused index memory addresses than that of prior-art apparatus 400.

Figure 8:
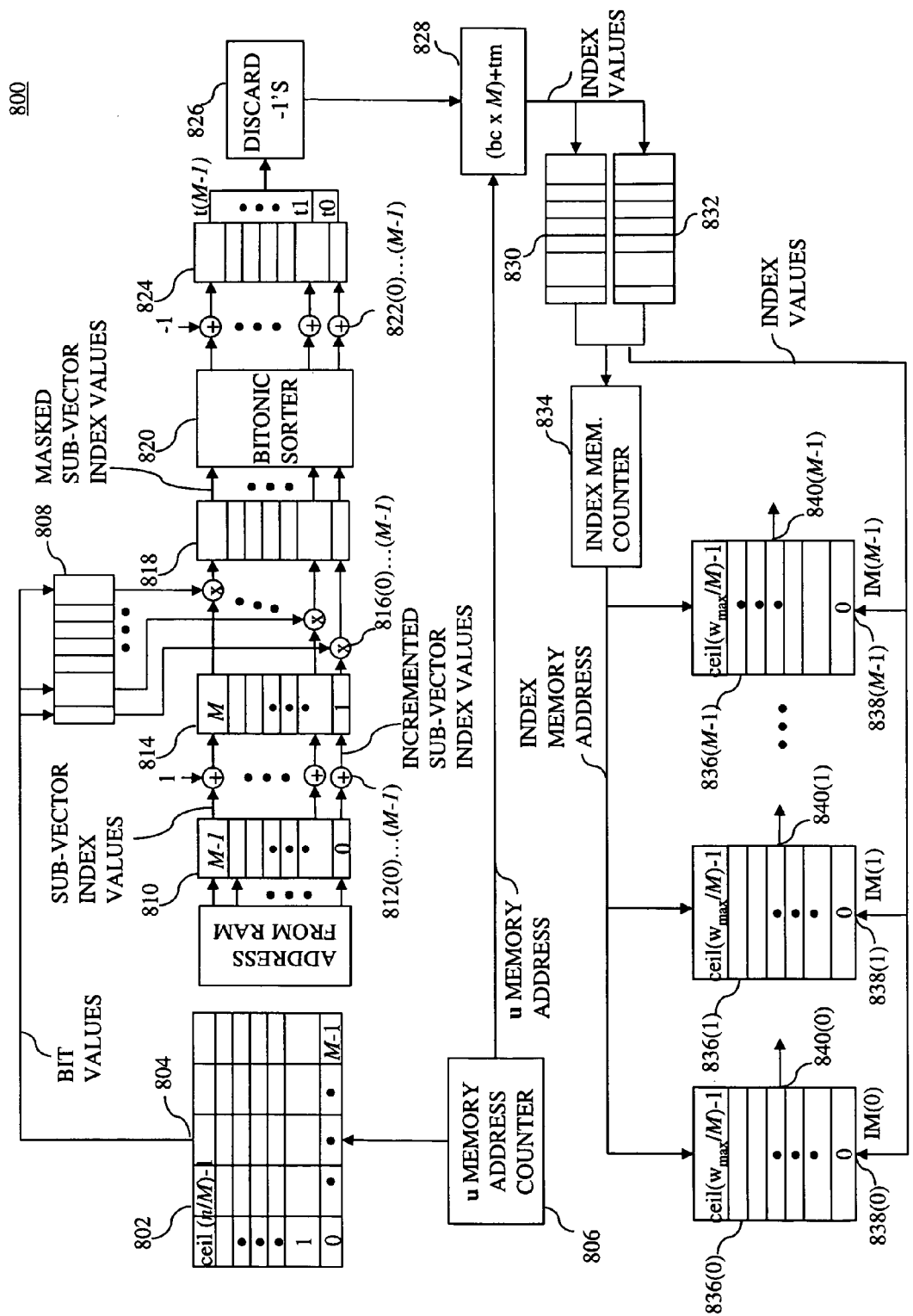
FIG. 8 shows a simplified block diagram of an apparatus that employs a semi-parallel architecture to determine index values for bits of a binary vector that have a value of 1 according to one embodiment of the present invention.

FIG. 8 shows a simplified block diagram of an apparatus 800 that employs a semi-parallel architecture to determine index values for bits of a binary vector u that have a value of 1, according to one embodiment of the present invention. Apparatus 800 has a parallelization factor of M, indicating that it generates index values for a number M of bits of a binary vector u during each clock cycle. In general, during each clock cycle, apparatus 800 applies a masking technique to M sub-vector index values (not to be confused with the index values of binary vector u), where each sub-vector index value corresponds to a different bit of a sub-vector s of binary vector u. The masking technique (i.e., 810, 812, 814, 808, 816) is applied to the M sub-vector index values such that (i) the sub-vector index values that correspond to bits having a value of 0 are zeroed out and (ii) the sub-vector index values that correspond to bits having a value of 1 are left unchanged. The masked sub-vector index values are sorted (i.e., 820), and binary-vector index values are calculated (i.e., 806, 824, 826, 828) based on the sorted masked sub-vector index values (i.e., 822), where the binary-vector index values range from 0, . . . , n−1. The binary-vector index values are then distributed uniformly to a number M of index memories (i.e., 836(0), . . . , 836(M−1)) such that the M index memories store substantially the same number of index values.

Apparatus 800 has vector memory 802, which is analogous to vector memory 402 of apparatus 400 of FIG. 4 (i.e., comprises a number ceil(n/M) of addresses, each of which stores M bits). During each clock cycle, a sub-vector s of binary vector u comprising M bits (i.e., m=0, . . . , M−1) is provided from read port 804 of vector memory 802 to first register 808. First register 808 comprises M addresses, where each address stores a different one of the M bits of the sub-vector s. Further, vector memory address counter 806 provides an address of vector memory 802 corresponding to sub-vector s to computation block 828 (discussed below). The vector memory addresses, which (i) begin at 0, (ii) increment by one during each clock cycle, and (iii) end at ceil(n/M)−1, may be represented in binary form, where the number of bits used to represent each address is at least $\log_2(\text{ceil}(n/M))$ bits.

The masking technique is performed using M sub-vector index values ranging from 0, . . . , M−1 (again, not to be confused with the index values of binary vector u), where each sub-vector index value corresponds to a different one of the M bits of sub-vector s. For example, sub-vector index value 0 corresponds to the first bit of sub-vector s, sub-vector index value 1 corresponds to the second bit of sub-vector s, sub-vector index value 2 corresponds to the third bit of sub-vector s, and so on. The same sub-vector index values (i.e., 0, . . . , M−1) are used for each sub-vector s, and they may be stored in second register 810, which comprises M addresses, where each address stores a different one of the sub-vector index values. Each sub-vector index value may be represented in binary form by at least $\log_2(M)$ bits, and thus, the size of second register 810 may be at least M addresses × $\log_2(M)$ bits per address.

Sub-vector index values 0, . . . , M−1 are provided to adders 812(0), . . . , 812(M−1), respectively, where they are incremented by 1 to generate incremented sub-vector index values ranging from 1, . . . , M, which are then stored in third register 814. Since sub-vector index values 0, . . . , M−1 and incremented sub-vector index values 1, . . . , M together range from 0, . . . , M (i.e., M+1 total values), the incremented sub-vector index values may be represented by a number bits equal to at least $\text{ceil}(\log_2(M+1))$.

The incremented sub-vector index values 1, . . . , M are then masked by multiplying (e.g., using multipliers 816(0), . . . , 816(M−1)) bits 0, . . . , M−1 of the sub-vector s stored in first register 808 by incremented sub-vector index values 1, . . . , M, respectively. Alternatively, each incremented sub-vector index value may be masked using binary AND gates rather than multipliers 816(0), . . . , 816(M−1). As a result of the masking, all of the incremented sub-vector index values that are multiplied by bits having a value of 0 are zeroed out, and all of the incremented sub-vector index values that are multiplied by bit having a value of 1 are unchanged. Thus, the M masked sub-vector index values output from multipliers 816(0), . . . , 816(M−1) comprise (i) incremented sub-vector index values corresponding to the bits of sub-vector s having a value of 1 and (ii) 0s corresponding to the bits of sub-vector s having a value of 0. Note that, if the sub-vector index values were not incremented (i.e., by adders 812(0), . . . , 812(M−1) and third register 814 were omitted), then the first sub-vector index value (i.e., 0) of second register 810 would always mask to 0, even when multiplied by a bit value of 1. To further understand the masking technique and the sorting technique, suppose that apparatus 800 has a parallelization factor M of 8 and processes the exemplary binary vector of FIG. 5, which comprises n=256 bits and has a hamming weight w of 64.

FIG. 9 shows Table VI, which illustrates incremented sub-vector index values that may be generated by apparatus 800 for the binary vector of FIG. 5. As shown, during each clock cycle, apparatus 800 generates incremented sub-vector index values ranging from 1, . . . , 8. The incremented sub-vector index values are shown in decimal units; however, as discussed above, each may be represented in binary form, where the number of bits used to represent each incremented sub-vector index value is at least $\text{ceil}(\log_2(8+1))=4$ bits.

FIG. 10 shows Table VII, which illustrates masked sub-vector index values that may be generated by apparatus 800 based on the incremented sub-vector index values of FIG. 9. During the first clock cycle (i.e., 0), bits 0, 1, 0, 0, 1, 0, 0, and 1 (i.e., sub-vector 0 shown in FIG. 5) are provided to multipliers 816(0), . . . , 816(7), respectively, where they are multiplied by incremented sub-vector index values 1, 2, 3, 4, 5, 6, 7, and 8 (from FIG. 9), respectively, to generate masked sub-vector index values 0, 2, 0, 0, 5, 0, 0, and 8 as shown in FIG. 10. During the second clock cycle (i.e., 1), bits 0, 1, 0, 1, 0, 0, 1, and 0 (i.e., sub-vector 1) are multiplied by incremented sub-vector index values 1, 2, 3, 4, 5, 6, 7, and 8, respectively, to generate masked sub-vector index values 0, 2, 0, 4, 0, 0, 7, and 0 as shown in FIG. 10. During the third clock cycle (i.e., 2), bits 0, 1, 1, 0, 0, 1, 0, and 0 (i.e., sub-vector 2) are multiplied by incremented sub-vector index values 1, 2, 3, 4, 5, 6, 7, and 8, respectively, to generate masked sub-vector index values 0, 2, 3, 0, 0, 6, 0, and 0. This process is repeated for subsequent clock cycles.

Referring back to FIG. 8, the M masked sub-vector index values are stored in fourth register 818, and are subsequently sorted using, for example, an M×M bitonic sorter 820, such that the M masked sub-vector values are arranged in decreasing order. Bitonic sorter 820 may comprise a fifth register, which comprises M addresses, where each address is capable of storing a sorted index value comprising at least ceil($\log_2$ (M+1)) bits.

After sorting, index values corresponding to binary vector u are calculated based on the masked sub-vector index values. First, the sorted, masked sub-vector index values are decreased by 1 using adders 822(0), ..., 822(M−1), and the decreased, sorted values are stored in sixth register 824. Decreasing the sorted, masked sub-vector index values by 1 restores all of the sorted, masked sub-vector index values that have a value greater than 0 to their respective, original sub-vector index values (i.e., the sub-vector index values before adders 812(0), ..., 812(M−1)). The sorted, masked sub-vector index values that have a value equal to 0 are decreased to −1 and are subsequently discarded (i.e., 826) so that the only sub-vector index values remaining are the sub-vector index values corresponding to bits having a value of 1.

FIG. 11 shows Table VIII, which illustrates how the masked sub-vector index values of FIG. 10 may be sorted by apparatus 800. For the first clock cycle (i.e., 0), masked sub-vector index values 0, 2, 0, 0, 5, 0, 0, and 8 (from FIG. 10) are sorted by bitonic sorter 820 to generate sorted, masked sub-vector index values 8, 5, 2, 0, 0, 0, 0, and 0, as shown in FIG. 11. For the second clock cycle (i.e., 1), masked sub-vector index values 0, 2, 0, 4, 0, 0, 7, and 0 are sorted to generate sorted, masked sub-vector index values 7, 4, 2, 0, 0, 0, 0, and 0. For the third clock cycle (i.e., 2), masked sub-vector index values 0, 2, 3, 0, 0, 6, 0, and 0 are sorted to generate sorted, masked sub-vector index values 6, 3, 2, 0, 0, 0, 0, and 0. For the fourth clock cycle (i.e., 3), masked sub-vector index values 1, 2, 0, 0, 0, 0, 0, and 0 are sorted to generate sorted, masked sub-vector index values 2, 1, 0, 0, 0, 0, 0, and 0.

FIG. 12 shows Table VIII, which illustrates how the sorted, masked sub-vector index values of FIG. 11 may be decreased by 1 using apparatus 800. For the first clock cycle (i.e., 0), sorted, masked sub-vector index values 8, 5, 2, 0, 0, 0, 0, and 0 (from FIG. 11) are decreased by 1 by adders 822(0), ..., 822(7), respectively, to generate sorted sub-vector index values 7, 4, 1, −1, −1, −1, −1, and −1 as shown in FIG. 12. For the second clock cycle (i.e., 1), sorted, masked sub-vector index values 7, 4, 2, 0, 0, 0, 0, and 0 are decreased by 1 to generate sorted sub-vector index values 6, 3, 1, −1, −1, −1, −1, and −1. For the third clock cycle (i.e., 2), sorted, masked sub-vector index values 6, 3, 2, 0, 0, 0, 0, and 0 are decreased by 1 to generate sorted sub-vector index values 5, 2, 1, −1, −1, −1, −1, and −1. For the fourth clock cycle (i.e., 3), sorted, masked sub-vector index values 2, 1, 0, 0, 0, 0, 0, and 0 are decreased by 1 to generate sorted sub-vector index values 1, 0, −1, −1, −1, −1, −1, and −1.

Referring back to FIG. 8, index values are then calculated based on the remaining sub-vector index values (i.e., the values >−1) by computation block 828 as shown in Equation (2) below:

$$\text{index value} = (bc \times M) + t_m \quad (2)$$

where M is the parallelization factor, bc is the address of vector memory 802 received from vector memory address counter 806, and $t_m$ is the $m^{th}$ sorted sub-vector index value from sixth register 824, where m=0, ..., M−1. The index values, which range from 0, ..., n−1, may be represented in binary form, where at least $\log_2(n)$ bits are used to represent each index value. As an alternative to performing the multiplication operation in Equation (2), a shift left operation may be performed, when the parallelization factor M is an integer power of 2.

These values are then distributed uniformly to index memories 836(0), ..., 836(M−1) by first storing the index values in seventh and eighth registers 830 and 832, each of which may comprise M addresses. The index values from computation block 828 populate seventh register 830 first, until it is full. When seventh register 830 is full, its contents are provided to (i) index memory counter 834 and (ii) index memories 836(0), ..., 836(M−1), while the index values from computation block 828 begin populating eighth register 832. Similarly, when eighth register 832 is full, its contents are provided to (i) index memory counter 834 and (ii) index memories 836(0), ..., 836(M−1), while the index values from computation block 828 begin populating register 830. For many binary vectors u, especially those having a relatively low hamming weight w, it will likely take several clock cycles to fill all M addresses of one of these registers. Further, during some clock cycles, there may more index values to be stored than there are addresses remaining in register 830 or 832. In this case, the excess (i.e., spill over) index values may then begin populating the other register (i.e., 830 or 832).

FIG. 13 shows Table X, which illustrates how index values, generated by the apparatus of FIG. 8 based on the sorted sub-vector index values of FIG. 12, may be stored in seventh and eighth registers 830 and 832 of FIG. 8. For the first clock cycle (i.e., 0), computation block 828 calculates index values based on sorted sub-vector index values 7, 4, 1 of FIG. 12 (note that the −1 values are discarded) using Equation (2), where (i) the parallelization factor M=8 and (ii) bc=0 for the first clock cycle. The resulting index values 7 (i.e., (8×0)+7=7), 4 (i.e., (8×0)+4=4), and 1 (i.e., (8×0)+1=1) are stored in the first three addresses (i.e., 0, 1, and 2) of register 830, respectively, as shown in FIG. 13. For the second clock cycle (i.e., 1), computation block 828 calculates index values based on sub-vector index values 6, 3, and 1 using Equation (2), where bc=1. The resulting addresses 14 (i.e., (8×1)+6=14), 11 (i.e., (8×1)+3=11), and 9 (i.e., (8×1)+1=9) are stored in the second three addresses (i.e., 3, 4, and 5) of register 830, respectively. For the third clock cycle (i.e., 2), computation block 828 calculates index values based on sub-vector index values 5, 2, and 1 using Equation (2), where bc=2. The resulting index values are 21 (i.e., (8×2)+5), 18 (i.e., (8×2)+2), and 17 (i.e., (8×2)+1). During this clock cycle, there are 3 index values and only 2 addresses (i.e., 6 and 7) in register 830. The excess index value (i.e., 17) is written to (i.e., spilled over to) the first address (i.e., 0) of register 832. This process is then repeated until register 832 is full, and, once register 832 is full, the entire process is repeated for subsequent clock cycles. The index values, which are shown in FIG. 13 in decimal form, may be stored in registers 830 and 832 in binary form, where each index value is represented by at least 8 (i.e., $\log_2(n)=\log_2(256)$) bits. Thus, the resulting size of each register 830 and 832 is at least 64 bits (i.e., 8 addresses×8 bits/address=64 bits).

Referring back to FIG. 8, when register 830 or register 832 is full, the register provides a set of M index values to index memories 836(0), ..., 836(M−1), such that each of the M index values is provided to a different one of the M index memories. Additionally, one index memory address is generated by index memory counter 834 and provided to all of the index memories so that the M index values are written to the same numbered address of their respective index memories. The index memory addresses begin at 0, increment by one every time the contents of register 830 or 832 are provided to the index memories, and end at ceil($w_{max}$/M) (i.e., index memory addresses range from 0, . . . , ceil($w_{max}$/M)).

If the total number of index values is not evenly divisible by M, then the remaining set of index values will not completely fill register 830 or 832. In this case, the remaining set of index values may be distributed to some of the M index memories even though register 830 or 832 is not full. These index values may be distributed in a number of different manners. For example, they may be distributed such that each index value is stored in a different index memory or such that two or more of the index values are stored in the same index memory. Further, the particular index memories to which these index values are distributed may vary.

Each of the M index memories may comprise ceil($w_{max}$/M) addresses, where each address may store one index value that is represented by at least $\log_2(n)$ bits. Thus, the size of each index memory may be equal to at least ceil($w_{max}$/M) addresses×$\log_2(n)$) bits per address, and the combined size of index memories 836(0), . . . , 836(M−1) may be equal to at least M×ceil($w_{max}$/M)×$\log_2(n)$).

FIG. 14 shows Table XI, which illustrates how the index values from FIG. 13 may be stored in the index memories of FIG. 8. As discussed above in relation to FIG. 13, after the first three clock cycles, register 830 is full. The M index values 7, 4, 1, 14, 11, 9, 21, and 18 stored in register 830 are then provided to (i) index memories 836(0), . . . , 836(7), respectively. Since no index values were previously stored in the index memories, each of the index values is stored in the first address (i.e., 0) of its respective index memory. After register 832 is full, its contents are provided to index memories 836 (0), . . . , 836(7) in a similar manner. Since index values were stored in the first address of the index memories, the index memory address is incremented by 1 by index memory counter 834 such that each index value from register 832 is written to the second address (i.e., 1) of its respective index memory. This process is repeated for subsequent clock cycles.

The combined size of the index memories employed by apparatus 800 (i.e., M×ceil($w_{max}$/M)×$\log_2(n)$) is smaller than the combined size of the index memories employed prior-art apparatus 400 of FIG. 4 (i.e., M×$w_{max}$×$\log_2(n)$). However, apparatus 800 also employs eight additional registers, where (i) register 808 has a size of M bits, (ii) register 810 has a size of M addresses×$\log_2(M)$ bits per address, (iii) registers 814, 818, 820, and 824 each have a size of M addresses×ceil($\log_2$(M+1) bits per address and (iv) registers 830 and 832 each have a size of M×$\log_2(n)$ bits. Even though apparatus 800 employs the eight additional registers, it may still employ less memory that that of prior-art apparatus 400. For example, in the example provided above in relation to FIG. 8, the combined size of the index memories employed by apparatus 800 is 512 bits (i.e., 8 index memories×8 addresses/index memory×$\log_2(256)$ bits/address), the size of register 810 is 8 bits, the size of register 810 is 24 bits (i.e., 8 addresses×$\log_2$ (8) bits/address), the combined size of registers 814, 808, 818, 820, and 824 is 128 bits (i.e., 5 registers×8 addresses/register×ceil($\log_2(9)$ bits/address), and the combined size of registers 830 and 832 is 128 bits (i.e., 2 registers×8 addresses/register×$\log_2(256)$ bits/address). Thus, the combined size of (i) the index memories and (ii) the additional registers employed by apparatus 800 is 800 bits. The combined size of the index memories employed by apparatus 400 for the comparable example provided above in relation to FIG. 4, on the other hand, is 4,096 bits. As the parallelization factor M increases, the combined size of the index memories of apparatus 400 increases at a relatively larger rate than the combined size of (i) the index memories and (ii) the additional registers employed by apparatus 800.

Figure 15:
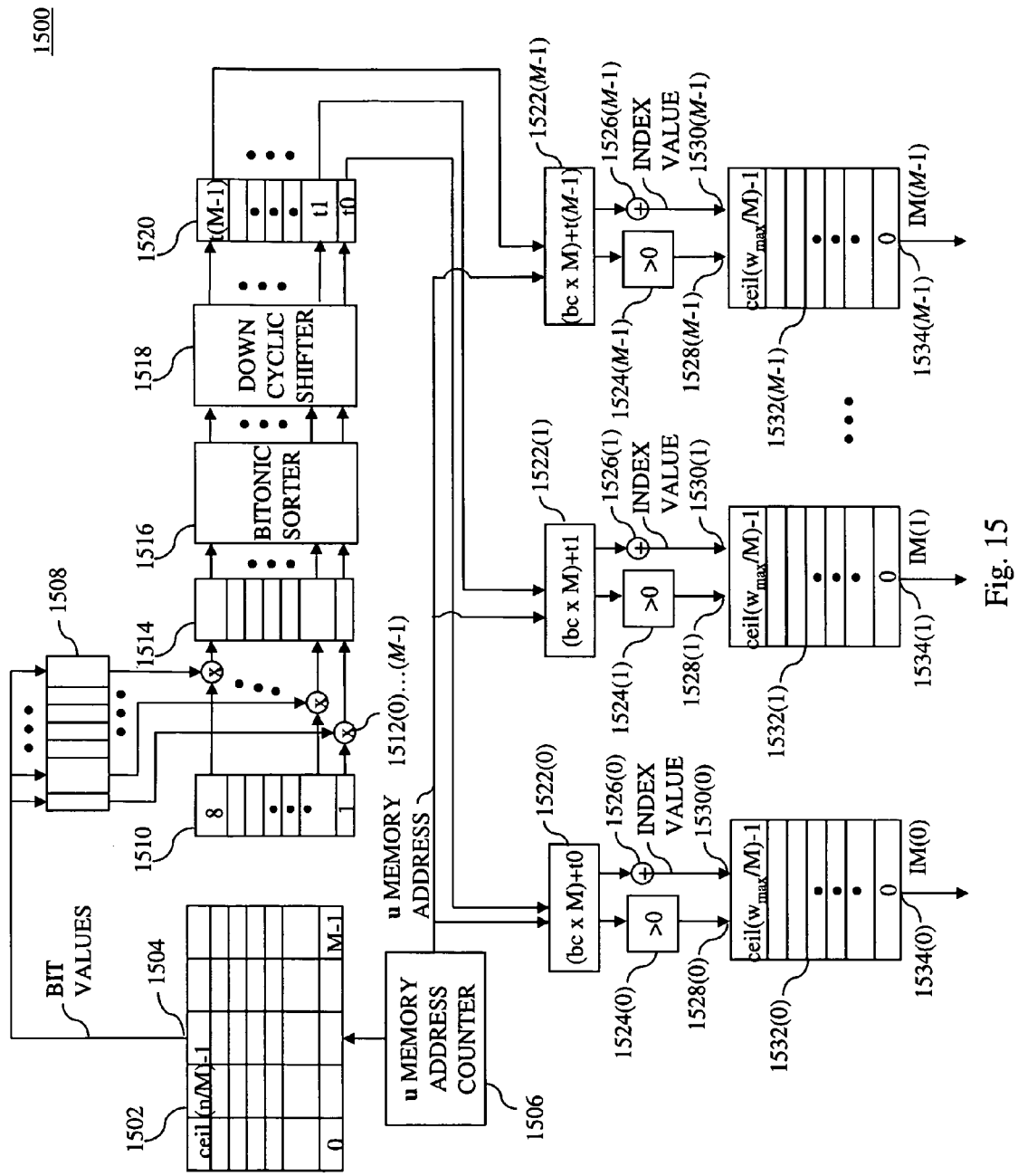
FIG. 15 shows a simplified block diagram of an apparatus that employs a semi-parallel architecture to determine index values for bits of a binary vector that have a value of 1 according to another embodiment of the present invention.

FIG. 15 shows a simplified block diagram of an apparatus 1500 that employs a semi-parallel architecture to determine index values for bits of a binary vector u that have a value of 1 according to another embodiment of the present invention. Similar to apparatus 800 of FIG. 8, apparatus 1500 has a parallelization factor of M. Apparatus 1500 performs general functions that are analogous to those performed by apparatus 800 of FIG. 8. In other words, during each clock cycle, apparatus 1500 (i) applies a masking technique (1508, 1512) to M sub-vector index values (1510), (ii) sorts (1516) the M masked sub-vector index values (1514), (iii) calculates (1506, 1522, 1526) index values based on the M masked sub-vector index values, and (iv) distributes the index values uniformly to a number M of index memories (1532(0), . . . , 1532(M−1)).

Apparatus 1500 has vector memory 1502, vector memory counter 1506, first register 1508, second register 1510, multipliers 1512(0), . . . , 1512(M−1), third register 1514, and bitonic sorter 1516, which perform operations analogous to vector memory 802, vector memory counter 806, first register 808, third register 814, multipliers 816(0), . . . , 816(M−1), fourth register 818, and bitonic sorter 820, respectively, to generate M sorted, masked sub-vector index values during each clock cycle. Note that apparatus 1500 does not comprise a register and adders that are comparable to second register 810 and adders 812(0), . . . , 812(M−1) of FIG. 8. Rather than incrementing the sub-vector index values, as is done by adders 812(0), . . . , 812(M−1) of apparatus 800, register 1510 of apparatus 1500 receives the incremented sub-vector index values from, for example, a counter or memory such as RAM or ROM. Given the same binary vector u and parallelization factor M, apparatus 1500 may generate the same sorted, masked sub-vector index values as apparatus 800.

The M sorted, masked sub-vector index values generated during each clock cycle are distributed uniformly to the M index memories. This is accomplished by first using down cyclic shifter 1518, which, during each clock cycle, calculates a shift coefficient and shifts the M values by the shift coefficient. The shift coefficient for the $i^{th}$ clock cycle is calculated as shown in Equations (3) and (4) below:

$$w_{acc,i-1} = w_{i-1} + w_{acc,i-2} \qquad (3)$$

$$\text{Shift Coefficient}_i = W_{acc,i-1} \bmod M \qquad (4)$$

where $W_{acc,i-1}$ is the accumulated hamming weight for the sub-vectors considered during clock cycles 0, . . . , i−1, $w_{i-1}$ is the hamming weight for the sub-vector s of binary vector u considered during the $(i-1)^{th}$ clock cycle, and $W_{acc,i-2}$ is the accumulated hamming weight for clock cycles 0, . . . , i−2. As shown in Equation (3), the accumulated hamming weight $W_{acc,i-1}$ for clock cycles 0, . . . , i−1 may be calculated by adding the accumulated hamming weight $W_{acc, i-2}$ for clock cycles 0, . . . , i−2 to the hamming weight $w_{i-1}$ for the sub-vector s considered during the $(i-1)^{th}$ clock cycle. The hamming weight $w_{i-1}$ for the $(i-1)^{th}$ clock cycle may be calculated by summing the bits of the sub-vector s considered during the $(i-1)^{th}$ clock cycle. Note that, for the first clock cycle, the accumulated hamming weight $W_{acc,i-1}$ for the previous clock cycle may be set to 0. The shift coefficient of the $i^{th}$ clock cycle is determined by performing a modulo operation (i.e., mod) for the accumulated hamming weight $W_{acc,i-1}$ for the previous clock cycle and the parallelization factor M as shown in Equation (4).

Once the M sorted, masked sub-vector values have been shifted, they are stored in register 1520, which is analogous to register 824 of FIG. 8 (i.e., comprises M addresses $t_0, \ldots, t_{M-1}$, such that each of the shifted sub-vector index values is stored in a different address of register 1520.

To further understand the shifting of sorted, masked sub-vector index values, suppose that apparatus 1500 (i) has a parallelization factor M of 8, (ii) processes the binary vector u of FIG. 5, and (iii) outputs the sorted, masked sub-vector index values of FIG. 11 from bitonic sorter 1516.

FIG. 16 shows Table XII, which illustrates the shift coefficients that may be generated by apparatus 1500 for the sorted, masked sub-vector index values of FIG. 11. For the first clock cycle (i.e., 0), the accumulated hamming weight $W_{acc,-1}$ for the previous clock cycle (i.e., $(i-1)^{th}$ clock cycle=−1) is set equal to 0; thus, down cyclic shifter 1518 calculates a shift coefficient of 0 using Equation (4) (i.e., 0 MOD 8=0). For the second clock cycle (i.e., 1), down cyclic shifter 1518 calculates an accumulated hamming weight $W_{acc,0}$ for the previous clock cycle (i.e., $(i-1)^{th}$ clock cycle=0) of 3 as shown in Equation (3) by adding (i) $w_0=3$, which is determined by summing the bits of sub-vector 0 of FIG. 5 and (ii) $w_{acc,-1}=0$. A shift coefficient of 3 is then calculated using Equation (4) (i.e., 3 MOD 8=3). For the third clock cycle (i.e., 2), down cyclic shifter 1518 calculates an accumulated hamming weight $w_{acc,1}$ for the previous clock cycle (i.e., $(i-1)^{th}$ clock cycle=1) of 6 as shown in Equation (3) by adding (i) $w_1=3$, which is determined by summing the bits of sub-vector 1 of FIG. 5 and (ii) $w_{acc,0}=3$. A shift coefficient of 6 is then calculated as shown in Equation (4) (i.e., 6 MOD 8=6). For the fourth clock cycle (i.e., 3), down cyclic shifter 1518 calculates an accumulated hamming weight $W_{acc,2}$ for the previous clock cycle (i.e., (i.e., $(i-1)^{th}$ clock cycle 2) of 9 using Equation (3) by adding (i) $w_2=3$, which is determined by summing the bits of sub-vector 2 of FIG. 5 and (ii) $w_{acc,1}=3$. A shift coefficient of 1 is then calculated using Equation (4) (i.e., 9 MOD 8=1).

FIG. 17 shows Table XIII, which illustrates the shifted sub-vector index values that may be generated by apparatus 1500 based on the sorted, masked sub-vector index values of FIG. 11 and the shift coefficients of FIG. 16. During the first clock cycle, the shift coefficient is 0, so the sorted, masked sub-vector index values corresponding to first sub-vector 0 are not shifted. During the second clock cycle, the shift coefficient is 3, so the sorted, masked sub-vector index values of FIG. 11 corresponding to second sub-vector 1 are shifted three places. During the third clock cycle, the shift coefficient is 6, so the sorted, masked sub-vector index values of FIG. 11 corresponding to the second sub-vector 1 are shifted six places. During the fourth clock cycle, the shift coefficient is 1, so the sorted, masked sub-vector index values of FIG. 11 corresponding to the second sub-vector 1 are shifted one place.

Referring back to FIG. 15, during each clock cycle, M shifted sub-vector index values stored in addresses $t_0, \ldots, t_{M-1}$ of register 1520 are provided to computation blocks 1522(0), ..., 1522(M−1), respectively. Additionally, one vector memory address is provided by vector memory address counter 1506 to all of the index memories. Each computation block then calculates an incremented index value as shown in Equation (5):

$$\text{incremented index value}=(bc \times M)+t_m \quad (5)$$

Note that, at this point, the incremented sub-vector index values range from 1, ..., n. The incremented index values are then provided to their respective adders 1526(0), ..., 1526(M−1), where they are decreased by 1, such that the resulting index values range from 0, ..., n−1. If any of the incremented index values generated by computation blocks 1522(0), ..., 1522(M−1) are greater than 0 (i.e., 1524(0), ..., 1524(M−1)), then the write port 1530(0), ..., 1530(M−1) of the corresponding index memory (i.e., 1532(0), ..., 1532(M−1)) is enabled so that the index value generated by the corresponding adder is written to the index memory. If the incremented index value is not greater than 0, then the corresponding index value is not written to the corresponding index memory.

Index memories 1532(0), ..., 1532(M−1) may be constructed as first-in, first-out (FIFO) memories, each comprising a number of addresses equal to ceil($w_{max}$/M). Each index memory address may store one index value that is represented by at least $\log_2(n)$ bits. Thus, the size of each index memory is equal to at least ceil($w_{max}$/M) addresses×$\log_2(n)$ bits per address, and the combined size of index memories 1532(0), ..., 1532(M−1) is equal to at least M×ceil($w_{max}$/M)×$\log_2(n)$ bits. Note that, in this embodiment, there is no index memory counter for index memories 1532(0), ..., 1532(M−1). Rather, the index values are written to the first available addresses of their respective index memories. As more index values are written, the previously written index values are forwarded to addresses that are closer to the output of their respective index memories. Once stored, the index values may be output from index memories 1532(0), ..., 1532(M−1) one index value at a time. In general, the rate at which index values are written to index memories 1532(0), ..., 1532(M−1) should preferably be less than the rate at which the index values are output from the index memories. If the input rate is greater than the output rate, then the index memories could overflow.

FIG. 18 shows Table XIV, which illustrates how index values, generated by FIG. 15 based on the shifted sub-vector index values from FIG. 17, may be stored in the index memories of FIG. 15. In particular, FIG. 18 shows the index values that may be generated for the first ten clock cycles. During the first clock cycle (i.e., 0), register 1520 provides shifted sub-vector index values 8, 5, 2, 0, 0, 0, 0, and (i.e., from clock-cycle 0 of FIG. 17) to computation blocks 1522(0), ..., 1522(7), respectively, and vector memory address counter 1506 provides vector memory address 0 to all of these computation blocks. Computation blocks 1522(0), ..., 1522(7) calculate incremented index values 8, 5, 2, 0, 0, 0, 0, and 0, respectively, using Equation (5), where bc=0 and M=8. Adders 1526(0), ..., 1526(7) then decrease the incremented index values by 1 to generate index values 7, 4, 1, −1, −1, −1, −1, and −1, respectively. Index values 7, 4, and 1 are initially written to the first addresses (i.e., 0) of index memories 1532(0), 1532(1), and 1532(2), respectively. However, after ten clock cycles, these index values are forwarded to address 2 as shown in FIG. 18. Since the remaining index values, which have a value of −1, do not correspond to incremented index values greater than 0, these index values are not written to index memories 1532(3), ..., 1532(7).

During the second clock cycle (i.e., 1), register 1520 provides shifted sub-vector index values 0, 0, 0, 7, 4, 2, 0, and 0 (i.e., from clock-cycle 1 of FIG. 17) to computation blocks 1522(0), ..., 1522(7), respectively, and vector memory address counter 1506 provides vector memory address 1 to all of these computation blocks. Computation blocks 1522(0), ..., 1522(7) calculate incremented index values 0, 0, 0, 15, 12, 10, 0, and 0, respectively, using Equation (5), where bc=1 and M=8. Adders 1526(0), ..., 1526(7) then decrease the incremented index values by 1 to generate index values −1, −1, −1, 14, 11, 9, −1, and −1, respectively. Index values 14, 11, and 9 are initially written to the first addresses of index memories 1532(3), 1532(4), and 1532(5), respectively. Similar to index values 7, 4, and 1, index values 14, 11, and 9 are forwarded to address 2 after ten clock cycles as shown in FIG. 18. Since the remaining index values, which have a value of −1, do not correspond to incremented index values greater than 0, these index values are not written to index memories 1532(0), 1532(1), 1532(2), 1532(6), or 1532(7).

During the third clock cycle (i.e., 2), register 1520 provides shifted sub-vector index values 2, 0, 0, 0, 0, 0, 6, and 3 (i.e., from clock-cycle 2 of FIG. 17) to computation blocks 1522(0), . . . , 1522(7), respectively, and vector memory address counter 1506 provides vector memory address 2 to all of these computation blocks. Computation blocks 1522(0), . . . , 1522(7) calculate incremented index values 18, 0, 0, 0, 0, 0, 22, and 19, respectively, using Equation (5), where bc=2 and M=8. Adders 1526(0), . . . , 1526(7) then decrease the incremented index values by 1 to generate index values 17, −1, −1, −1, −1, −1, 21, and 18, respectively. Index values 21 and 18 are initially written to the first addresses (i.e., 0) of index memories 1532(6) and 1532(7), respectively. By the tenth clock cycle, index values 21 and 18 are forwarded to address 2 and index value 17 is forwarded to address 1 as shown in FIG. 18. Since the remaining index values, which have a value of −1, do not correspond to incremented index values greater than 0, these index values are not written to index memories 1532(1), . . . , 1532(5).

Similar to apparatus 800 of FIG. 8, the combined size of the index memories and additional registers employed by apparatus 1500 may be smaller than the combined size of the index memories employed prior-art apparatus 400 of FIG. 4. Apparatus 1500 employs M index memories, each having a size of ceil($w_{max}$/M) addresses×$\log_2$(n) bits per address. Further, apparatus 1500 employs five additional registers, four of which (i.e., 1510, 1514, 1516, and 1520) each have a size of M addresses×ceil($\log_2$(M+1)) bits per address and one of which (1508) has a size of M bits. In the example provided above in relation to FIG. 15, the combined size of the index memories employed by apparatus 1500 is 512 bits (i.e., 8 index memories×8 addresses/index memory×$\log_2$(256) bits/address), the combined size of the four additional registers 1510, 1514, 1516, and 1520 is 128 bits (i.e., 4 registers×8 addresses/register×ceil($\log_2$(9) bits/address), and the size of register 1508 is 8 bits. Thus, the combined size of the (i) index memories and (ii) the additional registers employed by apparatus 1500 is 648 bits. The combined size of the index memories employed by apparatus 400 for the comparable example provided above in relation to FIG. 4, on the other hand, is 4,096 bits. As the parallelization factor M increases, the combined size of the index memories of apparatus 400 increases at a relatively larger rate than the combined size of (i) the index memories and (ii) the additional registers employed by apparatus 1500.

Figure 19:
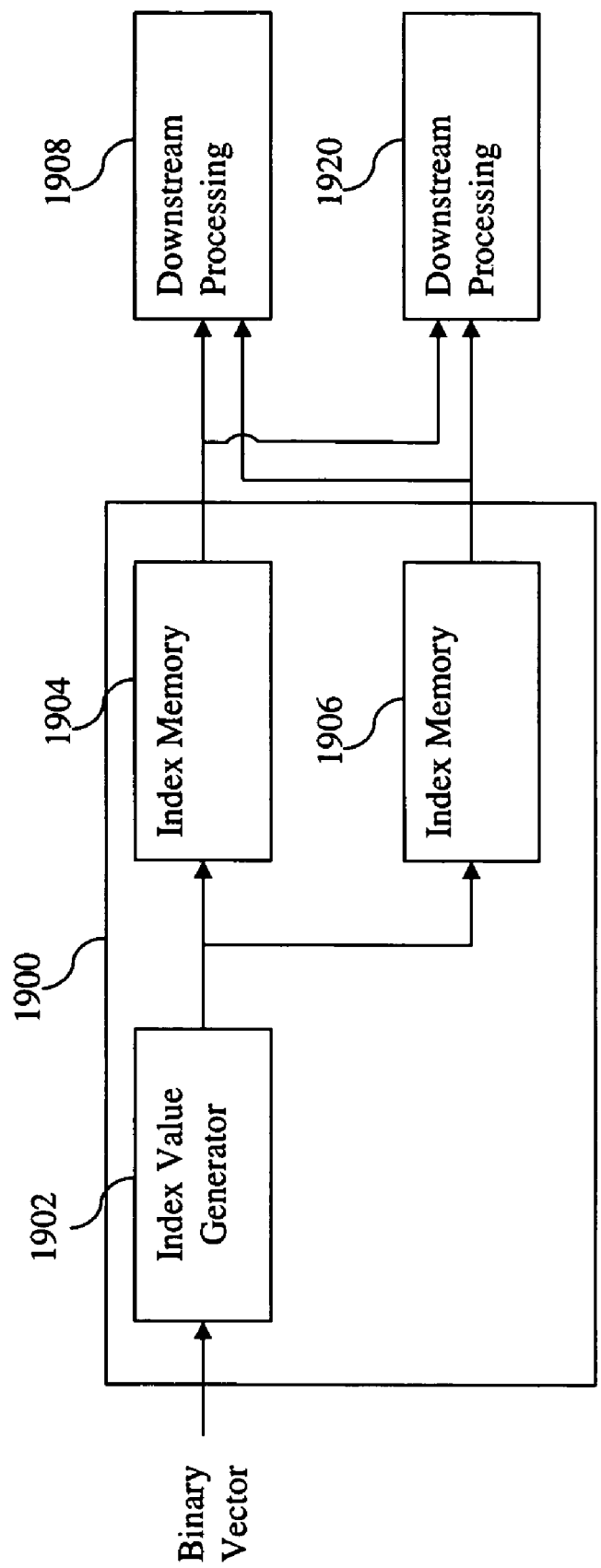
FIG. 19 shows a simplified block diagram of an apparatus according to one embodiment of the present invention that generates index values and provides the index values to downstream processing.

FIG. 19 shows a simplified block diagram of an apparatus 1900 according to one embodiment of the present invention that generates index values and provides the index values to downstream processing. Apparatus 1900 comprises an index value generator 1902, which may generate index values for bits of a binary vector that have a value of 1 in a manner similar to that of FIGS. 8 and 15. Each set of index values generated may be provided to either index memory 1904 or index memory 1906. Index memories 1904 and 1906 may each comprise M separate memory banks similar to those shown in FIGS. 8 and 15, or index memories 1906 and 1906 may each be implemented as one index memory partitioned into M memory banks. Together, index memories 1904 and 1906 act as ping-pong memories, indicating that sets of index values may be provided to index memories 1904 and 1906 in an alternating fashion. Thus, as index values are stored in one index memory, the other index memory may output index values to downstream processing 1908 or 1920.

Although index memories 1904 and 1906 are shown as separate blocks, they may be implemented together such that one half of the combined index memory is allocated to index memory 1904, and the other half of the combined index memory is allocated to index memory 1906. The index values stored in index memories 1904 and 1906 may then be processed using one or more sets of downstream processing. Each set of downstream processing may perform additional functions, depending on the particular application, to further process the index values or to exploit the index values generated for some purpose. In FIG. 19, two downstream processing blocks (i.e., 1908 and 1920) are shown. Similar to index memories 1904 and 1906, downstream processing blocks 1908 and 1920 may be implemented such that index values are provided to downstream processing blocks 1908 and 1920 in a ping-pong manner. For example, a first set of M index values may be provided to downstream processing 1908, a second set of M index values may be subsequently provided to downstream processing 1920, a third set of M index values may then be provided to downstream processing 1908, and so on.

Figure 20:
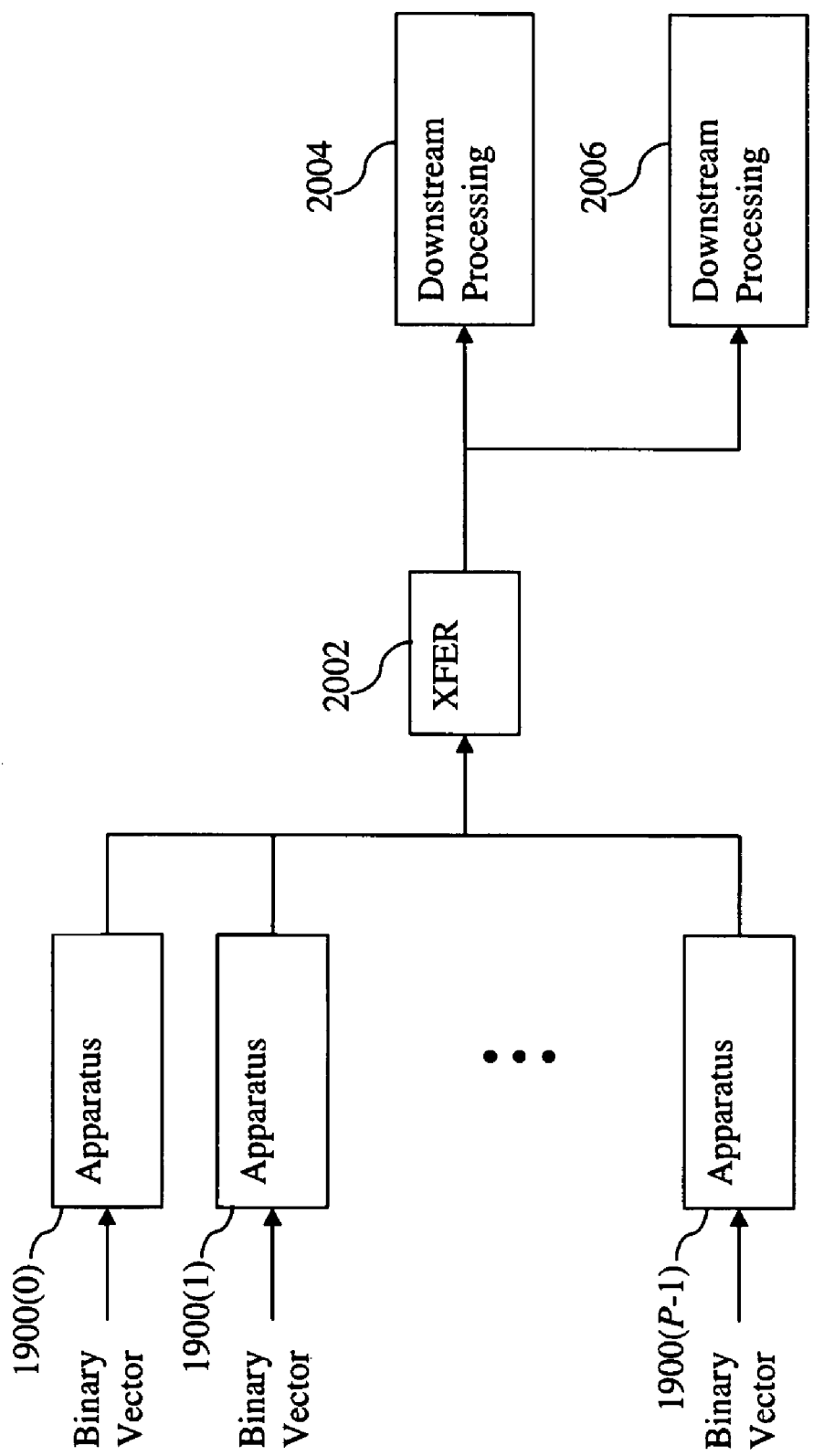
FIG. 20 shows a simplified block diagram of a plurality of apparatuses according to one embodiment of the present invention, which generate index values in a parallel manner.

FIG. 20 shows a simplified block diagram of a plurality of apparatuses 1900(0), . . . , 1900(P−1), which generate index values in a parallel manner, according to one embodiment of the present invention. A binary vector u is divided amongst the P apparatuses (i.e., 1900(0), . . . , 1900(P−1)), each of which is analogous to apparatus 1900 of FIG. 19. During each clock cycle, each apparatus generates index values corresponding to M bits of binary vector u, such that the P apparatuses generate index values corresponding to P×M bits. The index values are then provided to transfer block 2002, which schedules the transfer of index values to downstream processing 2004 and 2006. Similar to downstream processing blocks 1908 and 1920 of FIG. 19, the index values may be provided to downstream processing 2004 and 2006 in a ping-pong manner. This embodiment may be particularly advantageous when binary vector u is relatively large. In such instances, the number of clock cycles used to determine the index values corresponding to bits of binary vector u that have a value of 1 may be reduced over that employed by a comparable device having only one instance of apparatus 1900.

There are a number of different applications in which one or more apparatuses that determine the index values corresponding to bits of binary vector u that have a value of 1, such as the apparatuses of FIGS. 1, 4, 8, 19, and 20, may be used. For example, these apparatuses may be used in a training phase of a low-density parity-check (LDPC) decoder. During the training phase, hard-decision outputs from the LDPC decoder may be compared to hard-decision values that are known a priori by the decoder to generate an error signal that is a binary vector. The is in the binary vector correspond to the locations of erroneous bits in an LDPC code trapping set. Once these erroneous bit locations are determined for dominant trapping sets, downstream processing (e.g., 1908, 1920, 2004, 2006) may use the knowledge of these dominant trapping sets and their erroneous bit locations to improve decoder performance.

Various embodiments of the present invention may be envisioned in which elements of apparatus 800 are re-arranged, elements of apparatus 1500 are re-arranged, or elements of apparatuses 800 and 1500 are interchanged. For example, in FIG. 8, the masked sub-vector index values may be decreased by 1 using adders 822(0), . . . , 822(M−1) before they are sorted by sorter 820.

As another example, computation block 828 may be positioned after registers 830 and 832 such that these two registers store sorted sub-vector index values corresponding to bits having a value of 1, rather than index values corresponding to bits having a value of 1. In this case, the index values could be generated after the sorted sub-vector index values are output from registers 830 and 832.

As yet another example, computation block 828 of FIG. 8 or computation blocks 1522(0), . . . , 1522(M−1) of FIG. 15 may be located after their respective index memories so that sub-vector index values are stored in the respective index memories, and index values are calculated at the output of the index memories.

As yet still another example, in FIG. 15, comparisons such as those performed by blocks 1524(0), . . . , 1524(M−1) may be performed before computation blocks 1522(0), . . . , 1522(M−1). In this case, incremented index values would be generated by computation blocks 1522(0), . . . , 1522(M−1) only when the shifted sub-vector index values from register 1520 are greater than 0.

As yet even still another example, the shifted sub-vector index values from register 1520 may be decreased by 1 before computation blocks 1522(0), . . . , 1522(M−1), so that computation blocks 1522(0), . . . , 1522(M−1) generate index values rather than incremented index values. Numerous other arrangements are possible within the scope of this invention.

According to other embodiments of the present invention, the index values generated may range from 1, . . . , n rather than 0, . . . , n−1. For example, in FIG. 8, register 810 and adders 812(0), . . . , 812(M−1) may be eliminated since apparatus 800 would not need to generate incremented sub-vector index values. Also, the output of bitonic sorter 820 would not be need to be decreased so adders 822(0), . . . , 822(M−1) could be eliminated.

According to yet other embodiments, the sub-vector index values that are stored in the additional registers may be binary-vector index values. For example, in FIG. 15, during each clock cycle, eight binary-vector index values may be stored in register 1510 that are then multiplied by the corresponding bit values using multipliers 1512(0), . . . , 1512(M−1). For the first clock cycle, binary-vector index values 0, . . . , 7 may be stored in register 1510; for the second clock cycle, binary-vector index values 8, . . . , 15 may be stored in register 1510; for the third clock cycle, binary-vector index values 16, . . . , 23 may be stored in register 1510; and so on. Generally, this would increase the size of each storage location in register 1510 and in some of the other additional registers to handle the higher index values.

In general, apparatuses 800 and 1500 of FIGS. 8 and 15, respectively, may be said to distribute binary-vector index values substantially uniformly to M separate processing paths. The M separate processing paths may comprise M index memories as shown in FIGS. 8 and 15, or they may comprise M separate instances of downstream processing. In the latter case, the binary-vector index values may be processed upon being output from (i) registers 832 and 830 or (ii) adders 1526(1), . . . , 1526(M−1), rather than being stored in index memory.

It will be further understood that various changes in the details, materials, and arrangements of the parts which have been described and illustrated in order to explain the nature of this invention may be made by those skilled in the art without departing from the scope of the invention as expressed in the following claims. For example, embodiments of the present invention may be envisioned that generate index values corresponding to bits in a binary vector having a value of 0. As another example, embodiments similar to that of FIG. 8 may be envisioned that do not use bitonic sorting. As yet another example, various means may be used to discard the −1 values in FIG. 8. As even yet another example, embodiments may be envisioned that use more or fewer additional registers than the apparatuses of FIGS. 8 and 15. As even yet still another example, embodiments may be envisioned that use a right cyclic shifter, up cyclic shifter, or left cyclic shifter as opposed to the down cyclic shifter used in FIG. 15.

The various embodiments of the present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, micro-controller, or general-purpose computer.

The present invention can be embodied in the form of methods and apparatuses for practicing those methods. Certain aspects of the present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

I claim:

1. A machine-implemented method for processing a binary vector, the method comprising:
   (a) generating binary-vector index values for bits of the binary vector, wherein each binary-vector index value corresponds to a bit of the binary vector that is equal to a specified bit value; and
   (b) distributing the binary-vector index values substantially uniformly to M parallel output paths regardless of arrangement of the bits in the binary vector, wherein step (a) comprises:
      (a1) determining sub-vector index values for bits of a sub-vector of the binary vector, wherein each sub-vector index value corresponds to one of the bits of the sub-vector; and
      (a2) generating the binary-vector index values by applying processing to the sub-vector index values, wherein the processing comprises applying a masking technique to the sub-vector index values based on the bits of the sub-vector.

2. The method of claim 1, wherein step (a2) comprises:
   (a2i) applying the applying the masking technique to each sub-vector index value to generate a masked sub-vector index value;
   (a2ii) sorting the masked sub-vector index values; and
   (a2iii) calculating the binary-vector index values based on masked sub-vector index values that correspond to bits of the binary vector that are equal to the specified value.

3. The method of claim 1, wherein step (a2) comprises:
   (a2a) applying the masking technique to each sub-vector index value to generate a masked sub-vector index value; and
   (a2b) calculating the binary-vector index values based on masked sub-vector index values that correspond to bits of the binary vector that are equal to the specified value.

4. The method of claim 3, wherein:
   the binary vector comprises a plurality of sub-vectors;
   the method is performed for the plurality of sub-vectors, wherein:
      each sub-vector comprises M bits of the binary vector; and
      each sub-vector is assigned a different corresponding sub-vector number; and
   each binary-vector index value calculated in step (a2b) is proportional to:

$(bc \times M) + t_m$, where bc is the corresponding sub-vector number; and
   $t_m$ is an $m^{th}$ sub-vector index value of each sub-vector.

5. The method of claim 1, wherein:
   the binary vector comprises a plurality of sub-vectors;
   the method is performed for the plurality of sub-vectors to generate a plurality of sets of binary-vector index values; and
   step (b) comprises accumulating two or more of the sets of binary-vector index values before distributing the binary-vector index values to the M parallel output paths.

6. The method of claim 1, wherein step (a) comprises sorting values used to generate the binary-vector index values.

7. The method of claim 6, wherein step (a) comprises applying cyclic shifting to the sorted values.

8. The method of claim 7, wherein the cyclic shifting comprises cyclically shifting the sorted values by a shift coefficient proportional to:

$w_{acc,i-1}$ mod M, where $w_{acc,i-1}$ is an accumulated Hamming weight for previous sub-vectors of the binary vector.

9. The method of claim 1, wherein the M parallel output paths comprise M memory banks.

10. The method of claim 9, wherein each of the M memory banks comprise a number of storage locations that is not required to be any larger than ceil($w_{max}$/M), where (i) ceil(.) is a ceiling function and (ii) $W_{max}$ is a maximum possible Hamming weight of the binary vector.

11. The method of claim 10, wherein the number of storage locations is equal to ceil($w_{max}$/M).

12. The method of claim 1, wherein step (b) distributes no more than ceil($w_{max}$/M) to any one output processing path, where (i) ceil(.) is a ceiling function and (ii) $w_{max}$ is a maximum possible Hamming weight of the binary vector.

13. The method of claim 1, wherein the specified bit value is 1.

14. An apparatus for processing a binary vector, the apparatus comprising:
   (a) a binary vector index value generator adapted to generate binary-vector index values for bits of the binary vector, wherein each binary-vector index value corresponds to a bit of the binary vector that is equal to a specified bit value; and
   (b) an index value distributor adapted to distribute the binary-vector index values substantially uniformly to M parallel output paths regardless of how the bits are arranged in the binary vector, wherein the binary vector index value generator is adapted to generate binary-vector index values by:
      determining sub-vector index values for bits of a sub-vector of the binary vector, wherein each sub-vector index value corresponds to one of the bits of the sub-vector; and
      generating the binary-vector index values by applying processing to the sub-vector index values, wherein the processing comprises applying a masking technique to the sub-vector index values based on the bits of the sub-vector.

15. The apparatus of claim 14, wherein the binary vector index value generator comprises:
   a masker adapted to apply the masking technique to each sub-vector index value to generate a masked sub-vector index value;
   a sorter adapted to sort the masked sub-vector index values; and
   a binary-vector index calculator adapted to calculate the binary-vector index values based on masked sub-vector index values that correspond to bits of the binary vector that are equal to the specified value.

16. The apparatus of claim 14, wherein the binary vector index value generator comprises:
   a masker adapted to apply the masking technique to each sub-vector index value to generate a masked sub-vector index value; and
   a binary-vector index calculator adapted to calculate the binary-vector index values based on masked sub-vector index values that correspond to bits of the binary vector that are equal to the specified value.

17. The apparatus of claim 14, wherein:
the binary vector comprises a plurality of sub-vectors;
the apparatus is adapted to generate a plurality of sets of binary-vector index values for the plurality of sub-vectors; and
the index value distributor is adapted to accumulate two or more of the sets of binary-vector index values before distributing the binary-vector index values to the M parallel output paths.

18. The apparatus of claim 14, wherein the apparatus comprises a sorter adapted to sort values used to generate the binary-vector index values.

19. The apparatus of claim 18, the apparatus comprises a cyclic shifter adapted to apply cyclic shifting to the sorted values.

20. The apparatus of claim 14, wherein the M parallel output paths comprise M memory banks, wherein each of the M memory banks comprise a number of storage locations that is not required to be any larger than $\text{ceil}(w_{max}/M)$, where (i) ceil(.) is a ceiling function and (ii) $w_{max}$ is a maximum possible Hamming weight of the binary vector.

\* \* \* \* \*

UNITED STATES PATENT AND TRADEMARK OFFICE
CERTIFICATE OF CORRECTION

PATENT NO. : 8,392,692 B2
APPLICATION NO. : 12/333840
DATED : March 5, 2013
INVENTOR(S) : Kiran Gunnam It is certified that error appears in the above-identified patent and that said Letters Patent is hereby corrected as shown below:

In the Claims

Claim 4, Column 19, Line 52, replace "be" with "*bc*".

Signed and Sealed this
Thirtieth Day of July, 2013

Teresa Stanek Rea
*Acting Director of the United States Patent and Trademark Office*